United States Patent [19]

Chism, Jr.

[11] Patent Number: 4,692,808

[45] Date of Patent: Sep. 8, 1987

[54] PASSIVELY MODULATED PUSH BROOM DISPLAY

[75] Inventor: Samuel B. Chism, Jr., Houston, Tex.

[73] Assignee: Ford Aerospace & Communications Corporation, Detroit, Mich.

[21] Appl. No.: 902,811

[22] Filed: Sep. 2, 1986

[51] Int. Cl.$^4$ .............................................. H04N 5/74
[52] U.S. Cl. ..................................... 358/231; 358/63; 358/71; 358/250
[58] Field of Search ................. 358/231, 232, 233, 60, 358/88, 61, 92, 62, 63, 67, 71, 250

[56] References Cited

U.S. PATENT DOCUMENTS

| | | | |
|---|---|---|---|
| 3,723,651 | 3/1973 | Gorog . | |
| 4,127,322 | 11/1978 | Jacobson et al. | 358/61 |
| 4,191,456 | 3/1980 | Hong et al. | 350/156 |
| 4,307,930 | 12/1981 | Saito | 350/6.6 |
| 4,343,535 | 8/1982 | Bleha, Jr. | 350/342 |
| 4,368,489 | 1/1983 | Stemme et al. | 358/208 |
| 4,449,153 | 5/1984 | Tschang | 358/296 |
| 4,461,541 | 7/1984 | Duthie | 358/88 |
| 4,533,215 | 8/1985 | Trias et al. | 350/347 E |
| 4,575,722 | 3/1986 | Anderson | 358/92 |

OTHER PUBLICATIONS

"Litton Creates Solid-State Display with Low Power Requirements", Electronic Engineering Times, Mar. 12, 1984, p. 61 et seq.

Xerox Disclosure Journal, vol. 1, Nos. 11/12, Nov./Dec. 1976, p. 59.

"Dense LCD Light Valve Unveiled", Electronic Engineering Times, Mar. 12, 1984, p. 66.

News Release by Semetex Corp. and Accompanying Advertisement of its Sight-Mod Product Appearing in the Feb. 1986 Edition of Laser Focus/Electro-Optics.

Primary Examiner—Tommy P. Chin
Attorney, Agent, or Firm—Edward J. Radlo; Keith L. Zerschling

[57] ABSTRACT

Apparatus for producing a projected real-time visible display (9). A light source (2) and associated collimator (3,4) produces a collimated light beam (18) which is modulated by a linear array (6) of electronically controlled optical elements (16) with input data (30) that is formatted in a line-by-line fashion. A nutating mirror (8) sweeps the resulting modulated light beam (19) in synchronism with the input image line-segmented data (30), thereby producing the projected display (9). Elements comprising an electronic control circuit (11), which couples the input signal (30) to the modulator (6) and controls the nutation of the mirror (8), are presented, along with a timing diagram (FIG. 3) showing the functioning of the elements comprising said control circuit (11).

8 Claims, 3 Drawing Figures

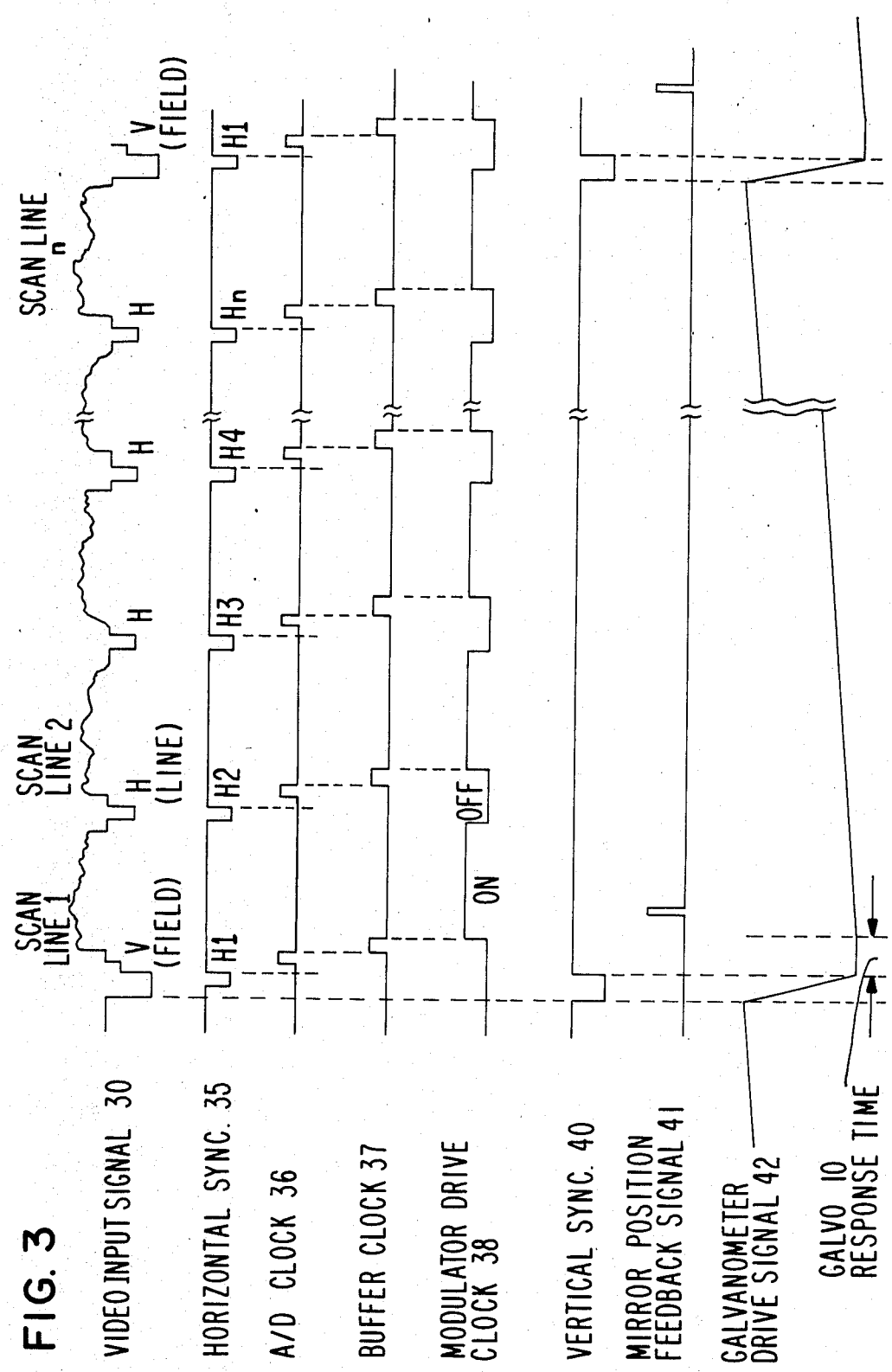

PASSIVELY MODULATED PUSH BROOM DISPLAY

DESCRIPTION

1. Technical Field

This invention relates to the field of forming a visible, real-time, moving display image on a front or rear projection screen.

2. Background Art

U.S. Pat. No. 4,449,153 discloses a device that uses a linear light valve array to modulate a beam of light passing through it to a moving recording medium. Electronically coded image data are input to the light valve element in synchronization with the movement of the recording medium, such that an image is produced on the medium. This differs from the present invention in that: (1) the image is produced on a recording medium such as film; the device cannot display a viewable real-time, moving image; (2) the successive image line segments are incrementally positioned by the linear motion of the recording medium rather than by a nutating mirror; and (3) the size of the resulting image is limited by the size of the film.

U.S. Pat. No. 4,307,930 describes a device for producing hard copies from an input image signal. A modulated laser beam is scanned horizontally with a galvanometer controlled mirror onto a rotating drum or linearly moving surface corresponding to the recording medium. This differs from the present invention for similar reasons stated above with respect to U.S. Pat. No. 4,449,153, namely: (1) it involves a recorded image, not a real-time viewable display; (2) successive image line segments comprising the vertical scan are provided by rotating or linear motion of the recording medium; (3) the size of the output image is restricted by the size of the recording medium; and (4) a single signal beam is scanned in raster fashion.

U.S. Pat. No. 3,723,651 describes a liquid crystal light valve (LCLV) projector in which a laser beam, modulated with video data, is raster scanned onto a photoconductive component of the light valve. This differs from the present invention in that it uses a raster scan, i.e., both horizontal and vertical sweeps, to produce the video image on the light valve element. Furthermore, the image so generated is not the final displayed and viewed image, but an intermediate modulation step leading to a larger, brighter projected display.

U.S. Pat. No. 4,533,215 describes a light valve projection device differing from the one disclosed in U.S. Pat. No. 3,723,651 in that it utilizes a reflective light element. A laser beam modulated with video data is raster scanned, using a rotating multi-element mirror 14b for horizontal scan and a nutating mirror 14c for vertical scan, onto the rear (photosensor layer) of the light valve element 15. The resultant image is conveyed to the front side of element 15, from which the display projection beam is reflected to produce a real-time projected display 11. Otherwise, the same comments on differences apply here as with U.S. Pat. No. 3,723,651. The present invention advantageously dispenses with the horizontal scan mirror.

*Xerox Disclosure Journal,* Vol. 1 Nos. 11/12, Nov./Dec. 1976, p. 59, shows an optical display which differs from the present invention in that: (1) it is not a real-time device; the output is built up over time; (2) LED 2 is an active modulator, as opposed to passive modulator 6 of the present invention; (3) liquid crystal 5 is used as a display, not as a modulator; and (4) mirror 3 steps rather than nutates.

References describing components which can be used as part of modulator 6 of the present invention are: "Dense LCD Light Valve Unveiled", *Electronic Engineering Times,* Mar. 12, 1984, p. 66; news release by Semetex Corp. and accompanying advertisement of its SIGHT-MOD product appearing in the Feb. 1986 edition of *Laser Focus/Electro-Optics;* and "Litton Creates Solid-State Display with Low Power Requirements", *Electronic Engineering Times,* Mar. 12, 1985, p. 61 et seq.

Secondary references are U.S. Pat. Nos. 4,127,322; 4,191,456; 4,343,535; and 4,368,489.

3. Disclosure of Invention

The present invention is a device for producing a projected real-time visible display (9). A light source (2) and associated collimator (3,4) produces a collimated light beam (18) which is modulated at a modulator (6) comprising a linear array of electronically controlled optical elements (16). The modulator (6) modulates the collimated light beam (18) with video information (31) from an input signal (30) that is formatted in a line-by-line manner. A nutating mirror (8) sweeps the modulated light beam (19), in a direction perpendicular to that of the linear array (6), in time synchronism with the input data (30), thus producing the projected display (9).

BRIEF DESCRIPTION OF THE DRAWINGS

These and other more detailed and specific objects and features of the present invention are more fully disclosed in the following specification, reference being had to the accompanying drawings, in which:

FIG. 3 is a timing diagram associated with the control circuit 11 illustrated in FIG. 2.

BEST MODE FOR CARRYING OUT THE INVENTION

Figure 1:
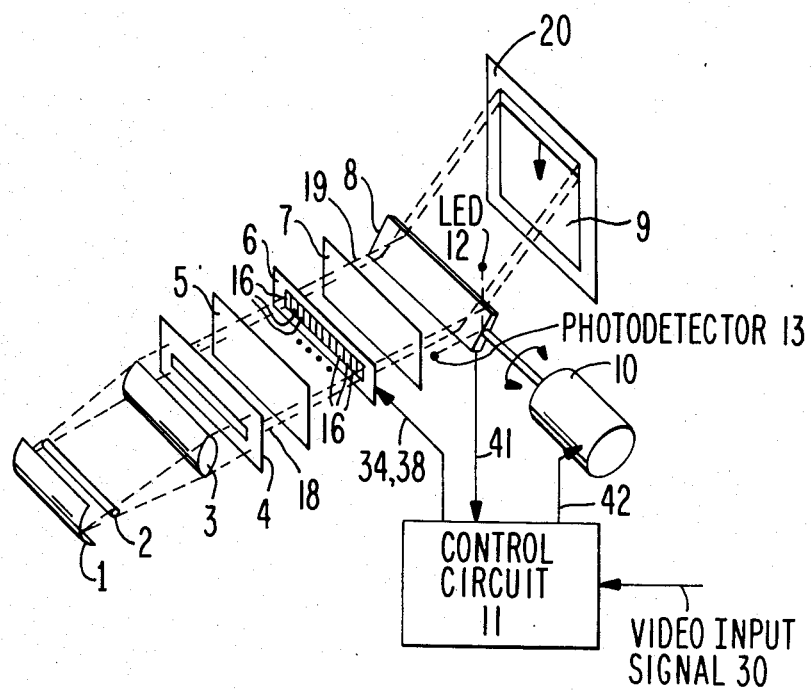
FIG. 1 is a partly schematic elevational view of a generalized configuration of a preferred embodiment of the present invention.

The present invention produces a projected image display 9 using a single moving mirror 8. A collimated light beam 18 having a thin rectangular cross-section is produced using an incandescent, electric arc, LED, laser diode, or laser light source 2. The beam from light source 2 is collimated, e.g., using cylindrical lens 3 and slit collimator 4. A cylindrical mirror 1 can be used behind source 2 if source 2 is a conventional, non-directional cylindrical light source. The resulting collimated light beam 18 is modulated by modulator 6. In the case of a laser source 2, an individual laser beam can be used to illuminate each element 16 of modulator 6, or a single laser source 2 could be utilized with appropriately designed optics.

Modulator 6 is preferably a linear array of optical elements 16 preceded by a polarizing filter 5 and followed by an analyzer 7, i.e., a polarizing filter which takes advantage of light that has already been polarized. Polarizing filter 5 may be dispensed with if light source 2 is polarized. Elements 16 can be LCD or magneto-optic elements. Modulator 6 is driven by electronic control circuit 11 in time synchronization with the video input signal 30, which is formatted on a line-by-line basis. The "lines" are sets of image data elements (pixels), which will ultimately be displayed horizontally on screen 20, e.g., a front or rear projection screen. An input image data element corresponds to each optical element 16. The effect is to sequentially modulate the collimated light beam 18 with image lines.

The modulated light beam 19 is reflected off nutating mirror 8 such that it is scanned vertically (downward in the case of conventional raster video) upon the display surface 20, producing a display image 9 corresponding to the input signal 30.

Since in FIG. 1 there are no refractive optics on the display 9 side of modulator 6, the display 9 is always in focus. Only the brightness and size are varied as the distance between display 9 and modulator 6 is varied.

The video input signal 30 can be a digital or analog signal, e.g., a conventional analog raster scan video signal or a sequential line-segmented analog or digital signal from an array sensor (e.g., a CCD detector array). Input signal 30 can be image signal 7 from the device described in my co-pending U.S. patent application Ser. No. 789,055, filed Oct. 18, 1985, and commonly assigned with the instant application. In any case, input 30 is in the form of horizontal line segments of the desired display 9.

Figure 2:
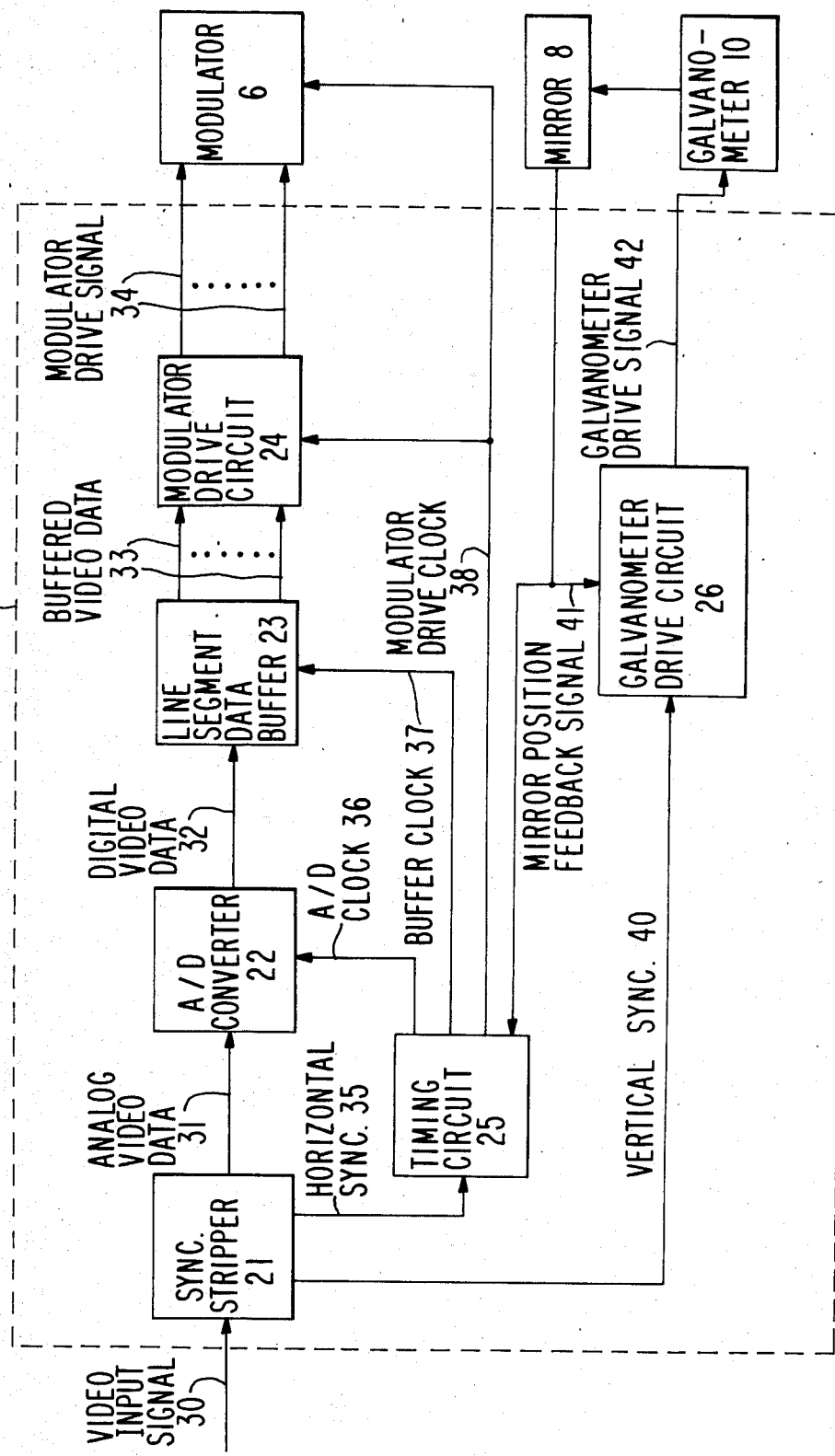
FIG. 2 is is a functional block diagram of a suitable control circuit 11 for use in the FIG. 1 embodiment.

Control circuit 11 can be appropriately designed to handle either analog or digital input signals 30. The particular control circuit 11 shown in FIG. 2 was designed for an analog signal 30 that is a composite of video data 31 and sync signals 35, 40 (see FIG. 3). The amplitude of analog signal 31 corresponds to the digitized levels of grey scale on the displayed image 9.

Circuit 11 controls linear array modulator 6 in correspondence with the incoming display line segments on signal 30, thus modulating the collimated linear light beam 18; and controls the nutation period of mirror 8 in correspondence with signal 30's vertical sync rate (frame or field rate as appropriate). As used herein, a "frame" is that amount of video data (pixels) needed to fill display 9. When the lines of pixels are not projected sequentially onto display 9, the frame is said to be divided into one or more "fields". In such a case, two or more interlaced "fields" are projected before the "frame" is completed.

Sync stripper 21 extracts the vertical (field or frame) sync signal 40 and the horizontal sync signal 35 from input signal 30. Stripper 21 can comprise two comparators which sense the two different negative amplitudes corresponding to the two sync signals 35, 40. After processing by stripper 21, the residual analog video data signal 31 is sent on to analog-to-digital (A/D) converter 22.

Timing circuit 25 receives the horizontal sync signal 35 from stripper 21, and outputs various clock signals 36-38 which control the flow of the image data to modulator 6. Because of limitations of the human eye, display 9 has to be refreshed at a rate of at least 25 frames per second in order to avoid flicker. Assuming that the image data on signal 30 are formatted in 525 lines/frame at 30 frames/second (National Television Standards Committee standard), this means that the line switching speed of modulator 6 must be at least 15,750 Hz. This corresponds to a line scan time of 63.4 microseconds.

An A/D clock 36 at the line repetition rate is generated by timing circuit 25 and sent to A/D converter 22, controlling the times at which new line segments of analog video data 31 are A/D converted. The resulting digital video data signal 32 from A/D converter 22 is read, line-by-line, into data buffer 23 upon receipt of each pulse on buffer clock 37 generated by timing circuit 25. Clock 37 has the same frequency as clock 36. The rising edge of a clock 37 pulse coincides with the falling edge of each clock 36 pulse. Buffer 23 is a serial-to-parallel converter. The number of parallel output lines 33 corresponds to the number of optical elements 16.

A modulator drive clock 38 generated by timing circuit 25 controls the time and rate at which the buffered, digitized video data signal 33 is used by modulator drive circuit 24 to drive modulator 6 via modulator drive signal 34. Modulator drive clock 38 is also sent to modulator 6 to control (time) the receptivity of modulator 6 to modulator drive signals 34. The rising edge of a clock 38 pulse coincides with the falling edge of each clock 37 pulse.

The vertical sync signal 40, comprising pulses appearing at the frame or field rate (as appropriate), is sent by sync stripper 21 to galvanometer drive circuit 26. The leading edge of each pulse on vertical sync signal 40 triggers galvanometer drive circuit 26 to initialize the position of nutating mirror 8, via ramp shaped galvanometer drive signal 42 controlling galvanometer 10, which in turn controls the positioning of mirror 8. The trailing edge of each pulse on vertical sync signal 40 is used by galvanometer drive circuit 26, in conjunction with mirror position feedback signal 41 generated by position determination means associated with mirror 8, to determine the precise time to initiate galvanometer drive signal 42.

Linear modulator 6 may be a $1 \times n$ linear array of optical elements 16, or one column or row of a two-dimensional LCD or magneto-optic matrix of elements 16.

A suitable LCD light modulator 6 is manufactured by UCE, Inc. of Norwalk, Connecticut. In this light modulator 6, the "active" or "on" element 16 can be made either opaque or transparent. For this application, opacity and transparency correspond to black and white pixels, respectively. Each modulator element 16 is made opaque by means of crystal particles therein lining up in response to electric fields from modulator drive signals 34. The polarized light produced by polarizer 5 is thus blocked. A modulator element 16 is made transparent to the polarized light by removing the electric field produced by the corresponding drive signal 34, dispersing the crystals. Grey scale can be achieved by using sufficiently small currents 34 to line up the crystals only partially.

A suitable magneto-optic modulator 6 is the one bearing the trade name SIGHT-MOD, manufactured by Semetex Corporation, Torrance, Calif. SIGHT-MOD is fabricated as an epitaxial garnet film grown on a nonmagnetic substrate. The array of pixels 16 is produced using conventional semiconductor manufacturing techniques. Each pixel 16 is electronically addressed via drive signal 34, affecting its magnetic state such that the light 18 incident on it is rotated either clockwise or counterclockwise in phase by means of the Faraday effect. The incident light 18 is first polarized by polarizer 5. The analyzer polarizing element 7 is oriented such that it blocks one rotation and passes the other. Pixel 16 sizes of 5 and 3 mils are available. The switching time per pixel 16 for currently available arrays ($48 \times 48$ and $128 \times 128$) averages about 100 nanoseconds. The contrast ratio is 20:1 for white light and 1000:1 (nominal) for monochromatic light. Grey scale can be achieved by having several sets of wires conveying signal 34 oriented at varying angles with respect to each of the pixels 16, or by magnetizing part of the pixel 16 in one direction and part in the opposing direction by means of running currents of varying magnitude through two orthogonal wires associated with each pixel 16.

Another suitable magneto-optic modulator 6 is one bearing the trade name Light-Mod manufactured by the Data Systems Division of Litton Industries, Van Nuys, Calif. Light-Mod is fabricated from bismuth-substituted iron-garnet films grown on non-magnetic substrates. It typically consists of an array of 1- to 20-mil-square pixels 16. As with SIGHT-MOD, one column or row of the array is used for modulator 6. The pixels 16 form a waffle-like grid, with electric conductors positioned in a similar grid pattern between pixels 16. This device 6 can be directly interfaced with modulator drive circuit 24. Light-Mod can be made with up to 200 pixels (16) per inch with a contrast ratio from 10:1 to 1000:1, depending upon illumination source 2 and the presence of any polarizers 5, 7. From 9 to 81 grey-scale levels are possible, with no reduction in resolution. Cycle time for changing the state of a single pixel 16 is less than 1 microsecond; the smaller the pixel 16, the faster the switching time. The power requirement, which is modest, is dependent upon the addressing sequence and the rate and size of the array 6. Since the device 6 is non-emissive, power is required only during the switching interval of the pixels 16.

When operating the Light-Mod 6, the magnetic orientation of a pixel 16 is altered or switched by passing a small electric current 34 through selected conductors which cross adjacent to the pixel 16. This switching of the magnetic orientation affects the light 18 passing through the selected pixel 16 using the Faraday effect. The effect causes the rotation of the plane-polarized light beam 18 as it passes through the pixel's magnetic field.

Maintaining the drive-line current 34 until the pixel 16 becomes magnetically saturated allows the pixel 16 to remain in a magnetized state indefinitely: until it is magnetized in the opposite direction by drive-line current 34. This eliminates the need for periodic modulator refresh signals 34, simplifies drive requirements, and results in very low power consumption and the potential for bandwidth compression.

In addition to the two stable states in which the magnetic field is uniform in one of two normal orientations, a third stable state is possible. In this state, part of the pixel 16 is magnetized in one direction, and part in the opposite direction in a selectable manner. This third state is the source of the grey scale.

The modulated linear light beam 19 leaving analyzer 7 is shown in FIG. 1 being directly reflected by nutating mirror 8 to the correct position in the output display image 9. For larger desired projection distances and display sizes, additional optical elements may be required. At the least this may consist of a lens between analyzer 7 and nutating mirror 8. The lens can be a cylindrical lens or a linear array of lens elements, depending on the initial light source 2 and the overall scaling of the remaining elements of the invention and of output display 9. Proper optical design of light source 2 and collimation means 4 may preclude additional optical elements at the output end, e.g., discrete laser light beam segments 18 could be utilized, affording very minimal beam spread (angular dispersion) and highly monochromatic light for maximum contrast.

The aforementioned mirror positioning means comprises a light source such as LED 12 and a photodetector 13, both of which are fixed with respect to optical elements 1–7 and display 9. As mirror 8 nutates, detector 13 receives a varying amount of light, which is converted to electrical form and sent as mirror position feedback signal 41 to control circuit 11. This signal 41 is at a peak when mirror 8 is positioned at an angle to reflect the light emanating from LED 12 directly to detector 13. This corresponds to a reference angle for mirror 8, e.g., that corresponding to projecting the first line of the image onto display 9.

Signal 41 is sent to galvanometer drive circuit 26 and to timing circuit 25 to compensate for any discrepancies in the actual position of mirror 8 (as conveyed by signal 41) and the desired position that will accommodate the time location of the input signal 30. Such discrepancies can occur, for example, by slippage in the motor driving mirror 8. Relatively large discrepancies are compensated in a relatively slow fashion (because of mechanical delays in galvanometer 10) by galvanometer drive circuit 26. Relatively small discrepancies are compensated in a fast fashion (because the compensation is electronic) by timing circuit 25. For purposes of simplification, the waveform on FIG. 3 representing feedback signal 41 is shown as having a constant amplitude with pronounced pulses corresponding to receipt by detector 13 of light from LED 12.

Color displays 9 can be produced by using color filters or different-colored light sources 2. In either case, the primary colors (red, blue, green) are generated in the form of three light beams 18 which are separately modulated by three modulators 6. This enables a $N^3$ range of output display colors, where N is the number of modulation levels (levels of grey scale for the black-and-white case). E.g., for elements 16 with just two modulation levels (either "on" or "off"), up to $2^3=8$ display colors can be produced.

Parallel modulators 6 (each being illuminated by a separate light beam 18) could be used to simultaneously scan multiple line segments, providing a means of reducing the required modulation speed. These line segments could either be contiguous or non-contiguous in the input image. In the contiguous line segment case, light source 2 would probably have to be pulsed to eliminate or at least minimize vertical smearing of the line data. In the non-contiguous line segment case, the scanning optics would require modification, e.g., using two or more nutating mirrors 8 or additional stationary mirrors. Either case would require additional buffering and control.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention. For example, modulator 6 could be transmissive rather than reflective. This might offer packaging advantages through the use of folded optics.

What is claimed is:

1. Apparatus for producing a projected real-time two-dimensional display, comprising:
   a stationary two-dimensional screen for receiving the display;
   a light source and associated optics for producing a collimated light beam;

a linear array of electronically controlled optical elements for modulating the collimated light beam with input image line-segmented data to form a modulated light beam; and a nutating mirror for sweeping the modulated light beam, in a direction orthogonal to that of the linear array of optical elements, in synchronism with the input image line-segmented data, thereby converting the modulated light beam into a two-dimensional display projected onto the screen.

2. Apparatus of claim 1 in which the mirror nutates at a rate corresponding to the frame rate of the input image line-segmented data.

3. Apparatus of claim 1 in which the mirror nutates at a rate corresponding to the field rate of the input image line-segmented data, resulting in an interlaced projected display.

4. Apparatus of claim 1 wherein the linear array comprises a plurality of LCD elements, said LCD elements corresponding to input image data elements, respectively.

5. Apparatus of claim 1 wherein the linear array comprises a plurality of magneto-optic elements, said magneto-optic elements corresponding to input image data elements, respectively.

6. The apparatus of claim 1 further comprising a control circuit coupled to the linear array and coupled, via a galvanometer drive, to the nutating mirror, said control circuit commanding the optical elements to modulate the light beam in correspondence to the input image line-segmented data.

7. The apparatus of claim 6 wherein the control circuit comprises a sync stripper, a buffer, a timing circuit, and a galvanometer drive circuit, interconnected as follows:

the sync stripper receives the input image line-segmented data and outputs a video data signal to the buffer, a horizontal sync signal to the timing circuit, and a vertical sync signal to the galvanometer drive circuit;

in response to the horizontal sync signal, the timing circuit generates pulses controlling, via the buffer, the receptivity of the linear array to the video data signal; and in response to the vertical sync signal, the galvanometer drive circuit generates a signal for driving the galvanometer drive.

8. The apparatus of claim 7 wherein the input image line-segmented data is organized into a sequence of fields each comprising several lines; and said apparatus further comprises means, associated with the mirror, for establishing a starting angular position of the mirror corresponding to the beginning of each field, said establishing means generating a signal sent to the timing circuit and to the galvanometer drive circuit for compensating for discrepancies between actual and desired angular positions of the mirror.

* * * * *